S. M. BERGER.
AUTOMOBILE JACK.
APPLICATION FILED JULY 8, 1920.

1,400,654.

Patented Dec. 20, 1921.

Inventor
Samuel M. Berger

By Attorney

UNITED STATES PATENT OFFICE.

SAMUEL M. BERGER, OF BROOKLYN, NEW YORK.

AUTOMOBILE-JACK.

1,400,654. Specification of Letters Patent. Patented Dec. 20, 1921.

Application filed July 8, 1920. Serial No. 394,775.

*To all whom it may concern:*

Be it known that I, SAMUEL M. BERGER, a citizen of the United States, and resident of the borough of Brooklyn, county of Kings, city and State of New York, have invented certain new and useful Improvements in Automobile-Jacks, of which the following is a specification.

This invention relates to improvements in automobile jacks and the principal object of the invention is to provide a jack which is adapted to be permanently secured to a vehicle so that it may be used to lift one end of a car in its entirety.

Another object of the invention is to provide a jack which is adjustable across the front end of the vehicle in order that the front end may be lifted as an entirety and that one or the other of the wheels be lifted individually.

As another object the invention contemplates the provision of jacks as above described which may be permanently attached to the vehicle in order that when the car is in dead storage, the front and rear wheels may be lifted to take the weight off of the tires.

Still another object of the invention resides in the provision of means for locking the jacks so as to prevent unauthorized persons from lowering the car and using the same.

With these and other objects in view the invention consists of a novel construction, combination and arrangement of parts which will be fully set forth in the following specification, claimed and illustrated in the accompanying drawings in which:—

Figure 1:
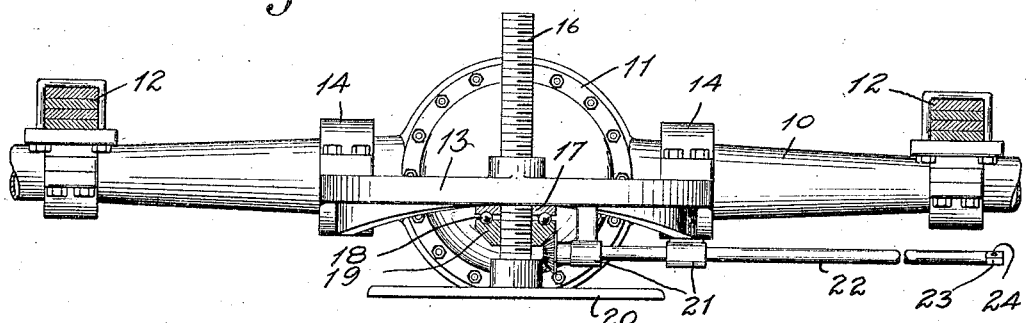
Figure 1, is a rear view of a rear axle showing this jack applied thereto, a portion of the jack being in section.

Referring to the drawings in detail, the numeral 10 designates in its entirety the rear axle of a vehicle provided with the usual differential housing 11 and the ordinary springs and shackles 12.

Figure 2:
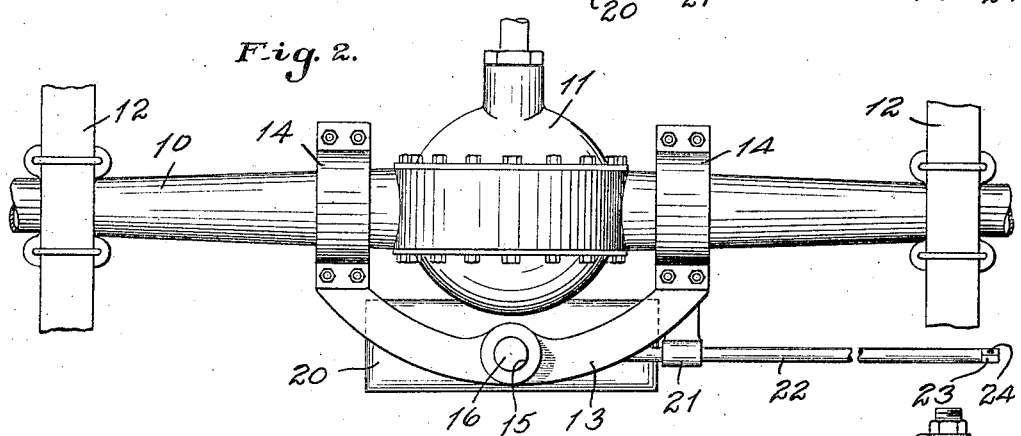
Fig. 2, is a top plan view of Fig. 1.
Figure 3:
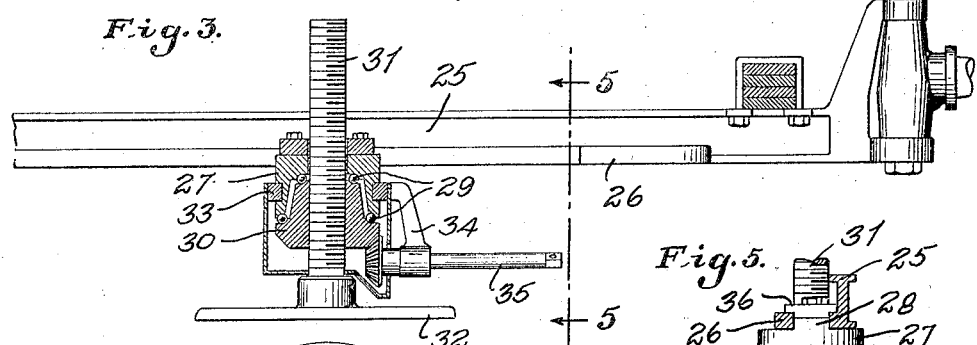
Fig. 3, illustrates a modified form of jack operating on the same principle and connected to the forward or front axle of the car.
Figure 4:
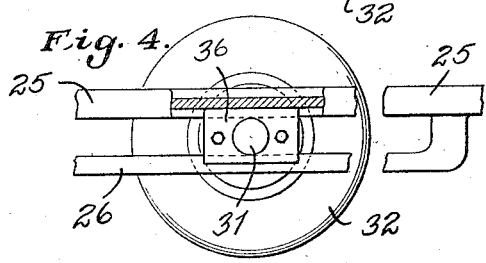
Fig. 4, is a top plan view of a portion of Fig. 3, showing a part of the front axle in section
Figure 5:
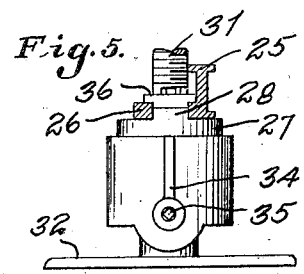
Fig. 5, is a vertical sectional view taken on line 5—5 of Fig. 3.

A yoke 13 having its ends provided with clamps 14 is secured to the axle 10 as illustrated in Figs. 1 and 2, and this yoke is provided intermediate its ends with a clearance opening 15 to receive the screw-threaded column 16 of the jack. The underside of the yoke is provided with a ball race 17 in which bearing balls 18 run, and threaded on the column 16 is a pinion 19 provided in its upper side with an annular groove which coöperates with the ball race 17 in providing a ball bearing between the pinion and the yoke.

The lower end of the column 16 is received in a socket carried by the base 20 and rotatably mounted in suitable brackets 21, carried by the yoke is a shaft 22 provided at its inner end with a beveled pinion which meshes with the pinion 19 and at its outer end with a squared portion 23 which is adapted to be received in a suitable wrench by which the shaft 22 may be rotated. The squared portion 23 is provided with an aperture 24 to receive the shackle of any type of lock not shown.

In use it will be seen that upon rotating the shaft 22 the pinion at the inner end thereof, will drive the pinion 19 and cause the column 16 to lower until such time as the base 20 engages the surface on which the car stands, whereupon continued rotation of the shaft 22 will tend to lift the car off of its wheels.

The front axle of the car is designated by the numeral 25 and is of the usual I-beam type and is provided with a parallel guide bar 26 which is preferably formed integral therewith and in a plane with the lower edge of the axle. A slide member 27 provided with an upstanding guide 28 which is received between the axle and the guide member 26, is provided with a central clearance opening and with an annular groove together with suitable ball races to receive the bearing balls 29. A gear 30 is provided with ball races coöperating with the ball races receiving the balls 29 and this gear is provided with an internal screw-threaded aperture to receive the screw threaded column 31 which is provided with a suitable base 32.

A ring 33 is rotatably mounted in the annular groove and carries a bracket 34 provided with a bearing to receive a shaft 35 carrying at its inner end a pinion which meshes with the gear 30 and at its upper end a suitable squared portion which is received in any desired type of wrench. Obviously as the shaft 35 is rotated, the gear 30 will be driven so as to lower the column 31 until the same contacts with the surface upon which the car is standing, whereupon the lifting action between the members will be had. It will also be obvious that the jack may be shifted longitudinal of the axle so as to lift one or the other of the front wheels or when the jack is positioned centrally of the front axle, it will be obvious that the front end of the car will be lifted in its entirety.

In order to secure the guide member 28 within the slot formed between the axle and the guide member 26, a suitable retaining plate 36 is provided and partially overlies the upper side of one of the lower flanges of the axle and the guide member 28. It will be understood that the squared end of the shaft 35 may also be pierced to receive the shackle of a lock in order to prevent unauthorized persons from operating the jack.

While in the foregoing there has been shown and described a preferred embodiment of this invention, it is to be understood that certain minor changes in the details of construction, combination and arrangement of parts may be resorted to without departig from the spirit and scope of the invention as claimed.

What is claimed is:—

1. The combination with the axles of a vehicle, of lifting jacks permanently associated therewith, one of the jacks having a fixed relation with one of the axles and the jack having sliding relation with the other axle.

2. The combination with a motor vehicle, of a lifting jack and means securing the jack permanently to the axles of the vehicle, one of said jacks having sliding movement on one of said axles and being adapted to lift one or two of the wheels from the ground.

3. The combination with a vehicle having a front and rear axle, of a yoke secured to the rear axle, a lifting jack secured to the yoke and centered relatively to the ends of the rear axle and a lifting jack carried by the front axle and adjustable longitudinal thereof.

4. The combination with the axle of a vehicle, of a yoke attached thereto, a lifting jack associated with the yoke and arranged in a plane with the center of the axle whereby when said jack is manipulated the rear axle will be lifted as an entirety.

5. The combination with axles of a vehicle, of a guide bar extending in a plane longitudinal with the side of the front axle, a lifting jack adjustable longitudinally of said axle and arranged between the axle and the guide bar, and a yoked lifting jack associated with the rear axle.

Signed in the city, county and State of New York, this 2nd day of July, 1920.

SAMUEL M. BERGER.